United States Patent [19]
Schacher et al.

[11] 3,819,021
[45] June 25, 1974

[54] HYDRAULIC CLUTCH WITH CONSTANT OPERATING STROKE

[75] Inventors: Willi Schacher; Heinz-Jürgen Beck, both of Friedrichshafen, Germany

[73] Assignee: Zahnradfabrik Friedrichshafen AG, Friedrichshafen, Germany

[22] Filed: Mar. 14, 1973

[21] Appl. No.: 341,243

[30] Foreign Application Priority Data
Mar. 15, 1972 Germany.......................... 2212342

[52] U.S. Cl......... 192/111 A, 188/196 A, 91/411 A
[51] Int. Cl............................................ F16d 13/75
[58] Field of Search .... 192/111 A; 188/196 A, 351; 91/411 R, 411 A

[56] References Cited
UNITED STATES PATENTS

| | | | |
|---|---|---|---|
| 1,569,143 | 1/1926 | Robinson | 188/351 |
| 2,638,750 | 5/1953 | Hettinger | 192/111 A |
| 2,746,575 | 5/1956 | Kinchin | 188/351 |
| 3,430,744 | 3/1969 | Oguri | 192/111 A |

*Primary Examiner*—Benjamin W. Wyche
*Attorney, Agent, or Firm*—Karl F. Ross; Herbert Dubno

[57] ABSTRACT

A hydraulic cylinder, whose piston controls a clutch to be engaged for a predetermined period, forms with an annular face of the piston a secondary fluid space expanding during the working stroke of the piston and contracting during its return stroke. The secondary fluid space communicates with a metering chamber in which an ancillary piston is displaceable against a fixed stop. A valve responsive to the actuating fluid pressure opens on the working stroke to connect the secondary fluid space to a source of hydraulic liquid under atmospheric pressure, the valve closing on the return stroke whereby the ancillary piston is displaced onto its stop and thereupon arrests the main piston after a displacement thereof over an invariable distance.

7 Claims, 1 Drawing Figure

PATENTED JUN 25 1974 3,819,021
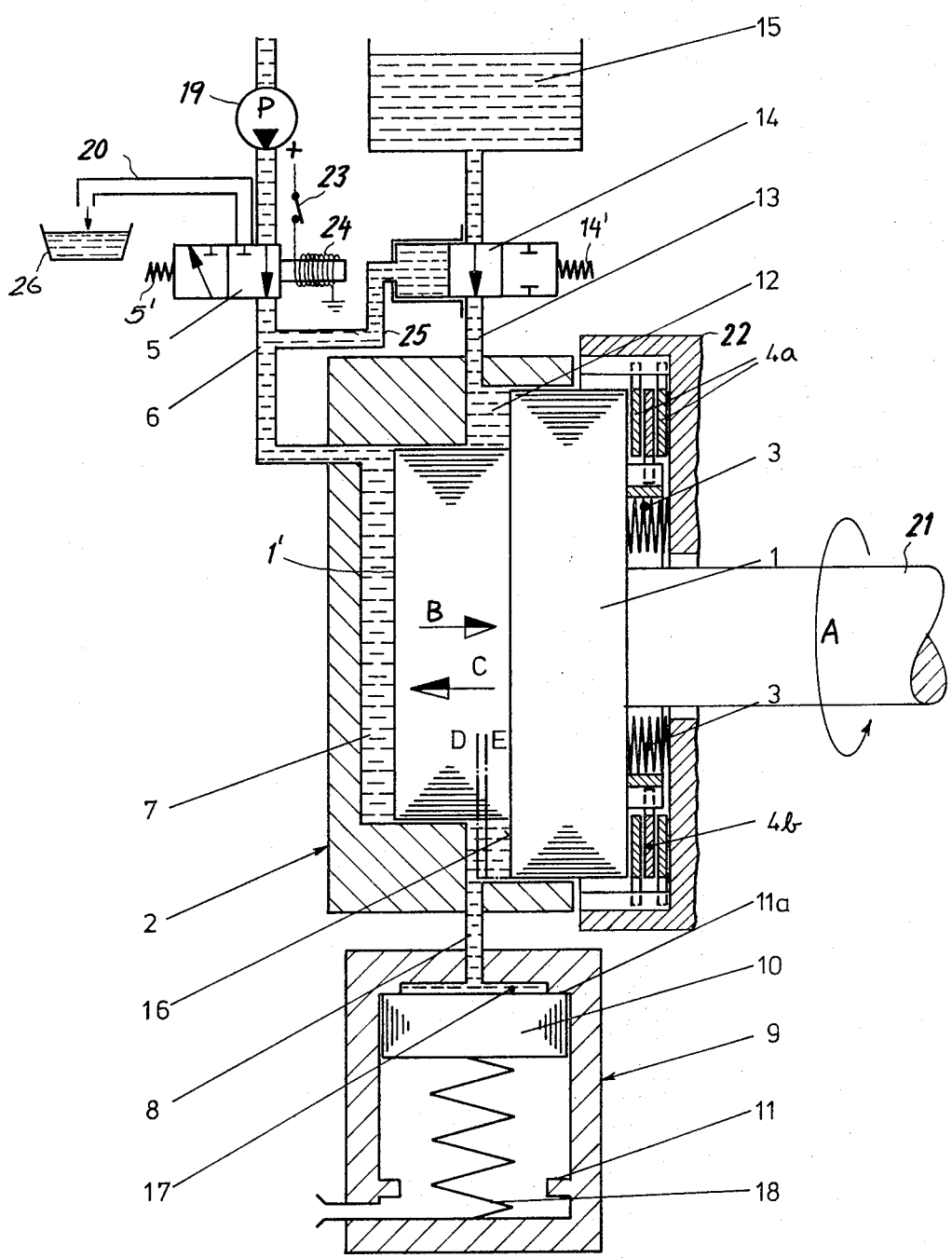

HYDRAULIC CLUTCH WITH CONSTANT OPERATING STROKE

FIELD OF THE INVENTION

Our present invention relates to a hydraulic device of the type wherein a piston is axially shiftable under the pressure of a hydraulic fluid to actuate a load. More specifically, our invention has reference to a hydraulic clutch designed for temporarily coupling two relatively rotating members, one of which may be the piston, to each other for entrainment of one member by the other.

BACKGROUND OF THE INVENTION

In some systems of this nature, such as power presses in which the entrained rotatable member is a ram-actuating eccentric, it is desirable that the working stroke of the piston be timed as accurately as possible in order that the work be performed under identical conditions in every operating cycle.

With conventional hydraulic clutches, however, such uniformity of the piston stroke cannot be indefinitely maintained since the wear of the clutch elements progressively lengthens that stroke and correspondingly increases the time required to shift the piston into load-actuating position.

OBJECTS OF THE INVENTION

It is, therefore, the general object of our invention to provide an improved hydraulic device having means for keeping constant the working stroke of its piston regardless of possible wear of clutch elements or other parts of an associated load.

A more specific object is to provide means for stabilizing the working stroke of a clutch-actuating hydraulic piston, particularly for heavy-duty power presses and similar equipment in which large masses have to be momentarily accelerated to considerable speeds.

SUMMARY OF THE INVENTION

Thes objects are realized, in conformity with our present invention, by the provision of a working piston defining with its cylinder not only the usual pressure chamber, referred to hereinafter as the primary fluid space, but also a secondary fluid space which is separated from the primary fluid space and which expands during the forward or working stroke of this piston and contracts during its return stroke. The secondary fluid space permanently communicates with a metering chamber containing an ancillary piston displaceable between fixed end stops. During the forward stroke of the working piston, the expanding secondary fluid space is connected to a supply of intercompressible liquid (e.g., hydraulic oil) held, advantageously, under substantially atmospheric pressure; the connection to the supply is blocked during the return stroke of the working piston so that the liquid trapped in this fluid space is forced into the metering chamber and arrests the working piston as soon as the ancillary piston in that chamber has moved from one of its end stops to the other. Since the distance between these end stops is invariable, the return stroke of the working piston is limited by the predetermined range of displacement of the ancillary piston.

The blocking and unblocking of the connection from the liquid supply to the secondary fluid space, in the rhythm of the reciprocation of the working piston, is effected by a value which may be controlled in various ways but advantageously responds to the pressure of hydraulic fluid (which could be the same as that of the aforementioned supply) in the primary fluid space.

BRIEF DESCRIPTION OF THE DRAWING

The above and other features of our invention will now be described in detail with reference to the accompanying drawing, the sole FIGURE of which diagrammatically illustrates a hydraulic clutch representing a preferred embodiment.

SPECIFIC DESCRIPTION

The device shown in the drawing comprises a hydraulic cylinder 2 in which a stepped piston 1 rigid with a rod 21 is axially shiftable. Piston 1 is also assumed to be rotatable about its axis, as indicated by an arrow A, and can be operatively coupled to a load 22 via a set of clutch elements in the form of a stack of annular foils 4a and 4b. Only one foil 4b sandwiched between two foils 4a has been illustrated, though the clutch may include a larger number of such interleaved foils which are axially slidable but are nonrotatable with reference to members 22 and 1, respectively, as is well known per se. The foils 4a and 4b frictionally engage one another upon a rightward movement of piston 1 into a load-actuating position, in the course of a forward stroke indicated by an arrow B; an array of biasing springs 3, compressed in that forward stroke, bring about a return stroke symbolized by an arrow C.

Piston 1 has an end face 1' which defines with cylinder 2 a primary fluid space 7. An annular shoulder 16 of the piston defines with the cylinder a secondary fluid space 12 hydraulically isolated from fluid space 7.

An electromagnetic master valve 5 in a conduit 6 controls the supply of hydraulic oil from a pump 19 to primary fluid space 7 and the subsequent draining of that space through a conduit 20 to a reservoir or sump 26. Valve 5 is actuated by a solenoid 24, working against a biasing spring 5', which is energizable in a circuit including a switch 23; the latter may be periodically opened and closed by a nonillustrated timer.

The secondary fluid space 12 is connected, through a conduit 13, to a reservoir 15 containing a supply of oil under atmospheric pressure; a slave valve 14 in line 13 alternately blocks and unblocks this connection. Valve 14 is hydraulically controlled via a branch line 25 of conduit 6 which is under the delivery pressure of pump 19 whenever the master valve 5 is open, as shown. In that case the slave valve 14 is opened against the force of a restoring spring 14', as illustrated, to admit liquid from supply 15 into space 12 which expands as the working piston 1 moves to the right (arrow B) under the pressure of oil admitted into space 7. Another conduit 8 links the space 12 with a metering chamber 17 in a housing 9 which contains an ancillary piston 10. A light spring 18 normally holds the piston 10 against an upper end stop 11a but readily yields to pressure in space 12, during the return stroke (arrow C) of piston 1 and with valve 14 closed, to let the piston 10 come to rest against a lower end stop 11.

With the mobility of ancillary piston 10 invariably restricted by abutments 11 and 11a, only a predetermined oil volume can be displaced by the returning working piston 1 so that this piston comes to a halt in a position in which ancillary piston 10 contacts the lower end stop 11. Since the amount of oil drawn into space 12 during the forward stroke of the piston is unlimited, this space will be completely filled with incompressible liquid no matter how far to the right the piston 1 moves during its forward stroke. On the other hand, the limited volume allowed to escape from space 12 into chamber 17 during the return stroke establishes a definite length of that stroke so that the annular piston face 16 may come to rest in different positions upon the completed withdrawal of piston 1. Thus, we have indicated at D a starting position for face 16 to which it returns as long as the clutch elements 4a and 4b have their original thickness. As that thickness decreases by progressive wear, this position shifts to the right as indicated at E. It will be understood that this shift is so gradual as to be imperceptible during any operating cycle whereby the length of the forward stroke (arrow B) remains practically constant even though it is the return stroke (C) whose length is determined by the stroke of the ancillary piston 10 in metering chamber 17.

The constancy of the stroke length results in a uniform displacement time as required for the piston 1 to shift into its load-actuating piston, given a constant supply pressure of pump 19. If switch 23 is closed for identical intervals during successive cycles, the operating period of the power press controlled by piston 1 will also be constant.

Either of the two coaxially rotatable members 1, 22 could be continuously driven from a nonillustrated motor, with the nondriven member carrying an eccentric for the displacement of a press ram. Naturally, the clutch 4a, 4b need not coact directly with piston 1 but could also be disposed between the load 22 and another rotatable member axially entrained by piston load 21; in that event the piston 1 and its load 21 could be nonrotatably mounted.

We claim:

1. A hydraulic device comprising:
    a hydraulic cylinder provided with conduit means for the admission and the discharge of a hydraulic liquid under pressure;
    a working piston reciprocable in said cylinder;
    control means connected to said cylinder intermittently operable to admit hydraulic liquid to a primary fluid space in said cylinder for driving said working piston in a forward stroke into a load-actuating position;
    biasing means for restoring said working piston to an idle position in a return stroke upon an at least partial discharge of said hydraulic liquid from said primary fluid space, said cylinder and said working piston defining a secondary fluid space isolated from said primary fluid space, said secondary fluid space expanding during said forward stroke and contracting during said return stroke;
    a supply of incompressible liquid provided with a connection to said secondary fluid space;
    valve means responsive to said control means for unblocking said connection during said forward stroke and for blocking said connection during said return stroke;
    a metering chamber permanently communicating with said secondary fluid space; and
    an ancillary piston in said metering chamber normally in engagement with a first end stop and displaceable, by fluid pressure from said secondary fluid space during said return stroke, into contact with a second end stop positioned at a fixed distance from said first end stop whereby the return stroke of said working piston is terminated after a predetermined shift of said working piston coinciding with a displacement of said ancillary piston from said first to said second end stop.

2. A device as defined in claim 1 wherein said valve means is provided with a control inlet communicating with said main fluid space.

3. A device as defined in claim 1 wherein said working piston is stepped and has an annular face confronting said secondary fluid space.

4. A device as defined in claim 1 wherein said ancillary piston is provided with resilient restoring means.

5. A device as defined in claim 1 wherein said biasing means comprises at least one spring bearing upon said working piston.

6. A device as defined in claim 1 wherein said working piston is rotatable about the cylinder axis and is provided with clutch means for establishing a driving connection between said working piston and the load in said working position.

7. A device as defined in claim 1 wherein said supply is under substantially atmospheric pressure.

* * * * *